United States Patent [19]

Murata et al.

[11] Patent Number: 5,249,058
[45] Date of Patent: Sep. 28, 1993

[54] APPARATUS FOR AUTOMATICALLY FOCUSING A CAMERA LENS

[75] Inventors: Haruhiko Murata, Moriguchi; Hirotsugu Murashima, Yamatotakada, both of Japan

[73] Assignee: Sanyo Electric Co., Ltd., Moriguchi, Japan

[21] Appl. No.: 4,639

[22] Filed: Jan. 12, 1993

Related U.S. Application Data

[63] Continuation of Ser. No. 668,518, Mar. 22, 1991, abandoned.

[30] Foreign Application Priority Data

Aug. 8, 1989 [JP] Japan ................................. 1-204973
Aug. 9, 1989 [JP] Japan ................................. 1-206164

[51] Int. Cl.⁵ .......................................... H04N 5/232
[52] U.S. Cl. .................................. 358/227; 354/400
[58] Field of Search ............... 358/227, 228, 209, 909; 354/400, 402, 409; 359/705, 698

[56] References Cited

U.S. PATENT DOCUMENTS

| | | | |
|---|---|---|---|
| 4,531,158 | 7/1985 | Murakami et al. | 358/227 |
| 4,638,364 | 1/1987 | Hiramatsu et al. | 358/227 |
| 4,833,541 | 5/1989 | Takuma et al. | 358/227 |
| 4,841,370 | 6/1989 | Murashima et al. | 358/227 |
| 4,853,788 | 8/1989 | Murashima et al. | 358/227 |
| 4,853,789 | 8/1989 | Murashima et al. | 358/227 |
| 4,872,058 | 10/1989 | Baba et al. | 358/227 |
| 4,881,127 | 11/1989 | Isoguchi et al. | 358/213.19 |
| 4,903,134 | 2/1990 | Murashima et al. | 358/227 |
| 4,920,369 | 4/1990 | Kaneda et al. | 354/400 |
| 4,920,420 | 4/1990 | Sano et al. | 358/227 |
| 4,922,346 | 5/1990 | Hidaka et al. | 358/227 |
| 4,967,279 | 10/1990 | Murashima et al. | 358/227 |
| 4,969,045 | 11/1990 | Haruki et al. | 358/228 |
| 5,003,339 | 3/1991 | Kikuchi et al. | 354/402 |
| 5,005,039 | 4/1991 | Hamada et al. | 354/402 |
| 5,005,040 | 4/1991 | Norita et al. | 354/402 |
| 5,055,933 | 10/1991 | Hidaka et al. | 358/227 |
| 5,061,954 | 10/1991 | Toyama et al. | 354/402 |
| 5,070,353 | 12/1991 | Komiya et al. | 354/402 |

FOREIGN PATENT DOCUMENTS

| | | |
|---|---|---|
| 63-17414 | 1/1988 | Japan . |
| 63-125910 | 5/1988 | Japan . |
| 63-217879 | 9/1988 | Japan . |
| 63-238772 | 10/1988 | Japan . |

Primary Examiner—Michael T. Razavi
Assistant Examiner—Tuan V. Ho
Attorney, Agent, or Firm—Peter L. Michaelson; Raymond R. Moser, Jr.

[57] ABSTRACT

The present invention relates to an automatic focusing camera in which an automatic focusing operation is performed by detecting a high frequency component of a video signal obtained from an image sensor device at every predetermined period, and has a theme that the automatic focusing operation can be performed within an extremely short time. To this end, by a search means, a focus lens is moved from a first position to a second position with relatively coarse steps to obtain a focus evaluating value for each step. In a first method, after the focus lens is moved to the vicinity of a lens position corresponding to a maximum focus evaluating value obtained by the search means, the focus lens is moved with small incremental steps to find a true maximum focus evaluating value. In a second method, a true maximum focus evaluating value is found from interpolated focus evaluating values obtained by interpolation of focus evaluating values exist in the vicinity of the maximum focus evaluating value obtained by the search means and adjacent to each other.

2 Claims, 12 Drawing Sheets

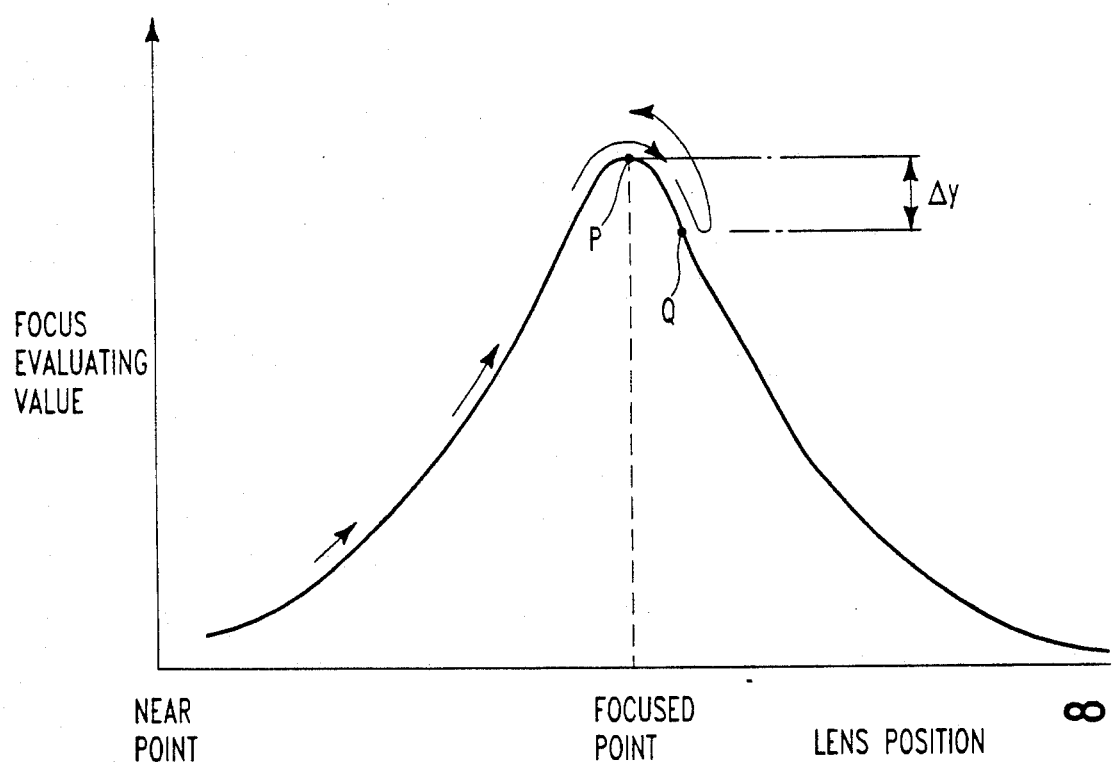

APPARATUS FOR AUTOMATICALLY FOCUSING A CAMERA LENS

CROSS REFERENCE TO RELATED APPLICATION

This application is a continuation of our copending patent application Ser. No. entitled automatic focusing camera filed on Mar. 22, 1991 as Ser. No. 07/668,518, now abandoned.

FIELD OF THE INVENTION

The present invention relates to an automatic focusing camera such as an electronic still camera having an automatic focusing function.

PRIOR ARTS

In an approach utilizing a high frequency component of a video signal from an image sensor device for evaluating a focus control in an automatic focusing apparatus of a camera, there are many advantages that exist, such as no parallax and that it is possible to exactly focus even if the depth of field is small or an object is located in the distance. Furthermore, in accordance with this approach, a specific sensor for automatic focusing need not be provided, so that the apparatus is very simple.

In Japanese Patent Laying-Open No. 63-125910 (G02B 7/11), one example of a so-called hill-climbing servo system is disclosed. Now, the outline of this prior art will be described with reference to FIG. 7 and FIG. 8.

FIG. 7 is a schematic block diagram showing a prior art auto-focusing system as a whole, wherein an image focused by a focus lens 1 is converted into a video signal by an image sensing circuit 4 which includes an image sensor device, and then, inputted to a focus evaluating value generating circuit 5. The focus evaluating value generating circuit 5 is constructed as shown in FIG. 8. A vertical synchronization signal VD and a horizontal synchronization signal HD which are separated from the video signal by a synchronization separating circuit 5a are inputted to a gate control circuit 5b for setting a sampling area that is a focusing area. The gate control circuit 5b sets a rectangular sampling area at a center portion of a screen based upon the vertical synchronization signal VD, the horizontal synchronization signal HD and an output of an oscillator which has a fixed frequency and drives the image sensor device, and supplies gate opening or closing signal to a gate circuit 5c so as to permit a luminance signal to pass only in a range of the sampling area.

Only the luminance signal corresponding to the range of the focusing area is applied to a high-pass filter (HPF) 5d so that only a high frequency component can be separated from the luminance signal and amplitude-detected by a detecting circuit 5e in a succeeding stage. A detected output is converted into a digital value by an A/D converting circuit 5f at a predetermined sampling period and sequentially inputted to an integrator 5g.

Specifically, the integrator 5g is a so-called digital integrator which is composed of an adder for adding A/D converted data and latched data of a latch circuit in a succeeding stage to each other, and a latch circuit which latches an added value and reset at every field, and a total sum of all the A/D converted data during one field period is outputted as a focus evaluating value. Therefore, the focus evaluating value generating circuit derives the luminance signal within the focusing area in a time sharing manner, and digitally integrates the high frequency components during one field period, and outputs the integrated value as the focus evaluating value of a current field. Next, with reference to a flowchart of FIG. 9, an operation of FIG. 7 will be described. Immediately after a start of an automatic focusing operation, a focus evaluating value at first is held in a maximum value memory 6 and an initial value memory 7 ($S_1$). Thereafter, a focus motor control circuit 10 rotates a focus motor (focus control means) 3 which moves the lens 1 in a direction of an optical axis thereof in a predetermined direction ($S_2$), and watches an output of a second comparator 9. The second comparator 9 compares a focus evaluating value after driving the focus motor and the initial evaluating value held in the initial value memory 7 and outputs a comparison output indicating "large" or "small".

The focus motor control circuit 10 causes the focus motor 3 to rotate in the initial direction until the second comparator 9 generates an output indicative of "large" or "small". In a case where the comparator output represents that the current focus evaluating value is larger than the initial evaluating value by the predetermined variation width is outputted, the focus motor control circuit 10 maintains the rotation direction as it is ($S_5$). Alternatively in a case where the comparator output represents that a current evaluating value is smaller than the initial evaluating value by the above described variation width, the rotation direction of the focus motor 3 is reversed ($S_4$), and an output of the first comparator 8 is watched ($S_3$).

The first comparator 8 compares a maximum focus evaluating value held in the maximum value memory 6 as yet with the current focus evaluating value and outputs two kinds of comparison signals P1 and P2 which represent that current focus evaluating value is larger than a content of the maximum value memory 6 (a first mode) and that the current focus evaluating value decreases more than a predetermined first threshold value (a second mode), respectively. In addition, the value of the maximum value memory 6 is updated in response to the output of the first comparator 8 in a case where the current focus evaluating value is larger than the content of the maximum value memory 6 ($S_7$), and therefore, a maximum value out of focus evaluating values by the present time is always held ($S_6$).

A reference numeral 13 denotes a position memory which receives a focus ring position signal designating a position of a focus ring 2 which supports the lens 1 and stores a focus ring position, and the position memory 13 is, as similar to the maximum value memory 6, updated in response to the output of the first comparator 8 so as to always store a focus ring position of a case where a maximum evaluating value is obtained. Now, it is well-known in the art that the focus ring 2 is rotated by the focus motor 3 and the lens 1 is moved in an optical axis direction in response to a rotation thereof. In addition, the focus ring position signal is outputted by a potentiometer which detects a focus ring position; however, if the focus motor 3 is a stepping motor and the rotation amounts of the motor toward a near point and an infinite-point are respectively represented by stepping amounts of positive (+) and negative (−), it is possible to represent the focus ring position by the stepping amount of the focus ring or the focus motor.

The focus motor control circuit the 10 monitors the output of the first comparator 8 while the same rotates the focus motor 3 in a direction determined in accordance with the output of the second comparator 9 so as to reversely rotate the focus motor 3 when the output of the first comparator 8 designates the second mode, i.e., the difference between the current evaluating value and the maximum evaluating value is smaller than the above described predetermined first threshold value ($\Delta y$) (when the current evaluating value reaches Q of FIG. 10 a threshold value is used in order to prevent a malfunction due to noise corrupting the evaluating values ($S_8$).

After this reverse rotation, the content of the motor position memory 13 is compared with the current focus ring position signal by a third comparator 14 ($S_9$). Consequently, the focus motor control circuit 10 functions to rotate the focus motor 3 until the both become coincident with each other ($S_{10}$) and, when coincident, that is, when the focus ring 2 returns to a position P at which the focus evaluating value becomes maximum, the focus motor 3 is stopped ($S_{11}$). At the same time, the focus motor control circuit 10 outputs a lens stop signal LS.

Thus, a conventional automatic focusing apparatus performs a focusing operation while the focus ring is always moved by a small amount (at every field) from a nearest point to an infinite-point in a focusable range of the lens, and therefore, it takes 2 seconds to move the focus lens from the above described nearest point to the infinite-point, but no problems occur in a video camera which mainly takes a moving picture over such an extent of time.

However, in general, in an electronic still camera, an image of an object in an instant is taken as a still image, and therefore, in the above described conventional system in which 2 seconds are required from a time when a shutter button is depressed until an automatic focusing operation is completed, as a result, a camera operator feels a release time lag so that the camera is very difficult to use and there is a possibility of missing a shutter chance, and therefore, it is not practical.

DISCLOSURE OF THE INVENTION

The present invention is made in view of the above described points, and in an automatic focusing camera in which an automatic focusing operation is performed by detecting a high frequency component level of a video signal obtained from an image sensor device as a focus evaluating value at every predetermined period, the present invention is constructed to comprise first search means which moves a focus lens between a nearest point and an infinite-point with relatively rough steps and obtains a focus evaluating value for each step, and second search means which moves said focus lens to the vicinity of a lens position corresponding to a first maximum focus evaluating value which is obtained by said first search means, and thereafter, further moves said focus lens in the vicinity of said lens position with precise steps and obtains a second maximum focus evaluating value from focus evaluating values at respective precise steps.

Another feature of the present invention is that an automatic focusing camera performs an automatic focusing operation by detecting a high frequency component level of an image signal obtained from a video sensor device as a focus evaluating value at every predetermined period. The present invention is constructed so as to comprise search means which moves a focus lens between an infinite-point and a nearest point with relatively rough steps and obtains a focus evaluating value for each step, interpolation means for interpolating between a first maximum focus evaluating value obtained by said search means and a focus evaluating value existing in the vicinity of the first maximum focus evaluating value and adjacent to the first maximum focus evaluating value to generate interpolated focus evaluating values, and focus evaluating value determining means for determining a second maximum focus evaluating value from the interpolated focus evaluating values obtained by said interpolation means.

By such structure, it is possible to perform a focusing operation from a time when a shutter button is depressed to a time when the picture is taken, i.e., the automatic focusing operation is completed within an extremely short time (for example, 0.5 seconds).

In the following, preferred embodiments of the present invention will be described.

BRIEF DESCRIPTION OF THE DRAWINGS

FIG. 10 is a characteristic chart for explaining a conventional focusing operation.

BEST MODE FOR EMBODYING THE INVENTION

First Embodiment

Figure 1:
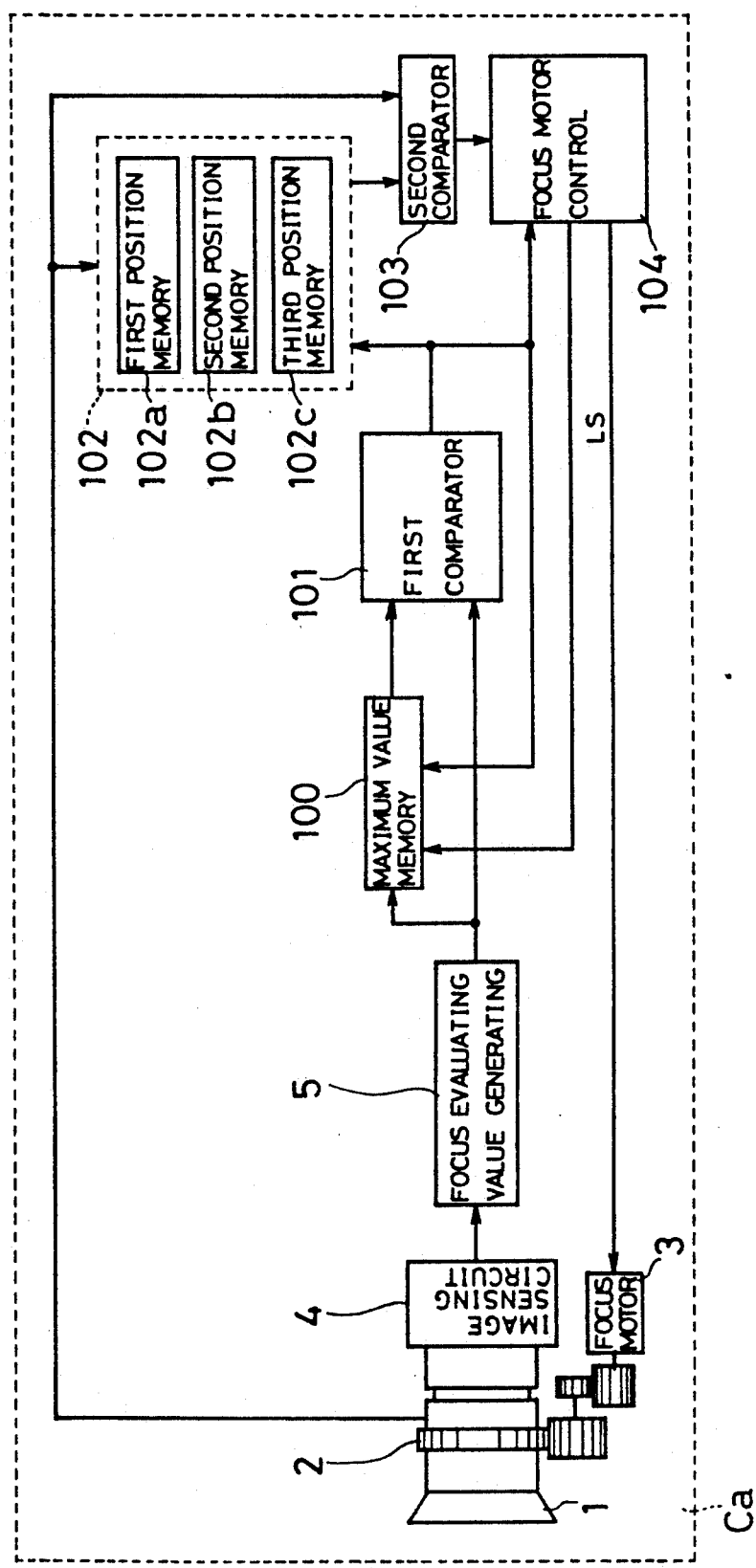
FIG. 1 is a primary block diagram showing a first embodiment of an automatic focusing camera in accordance with the present invention.
Figure 7:
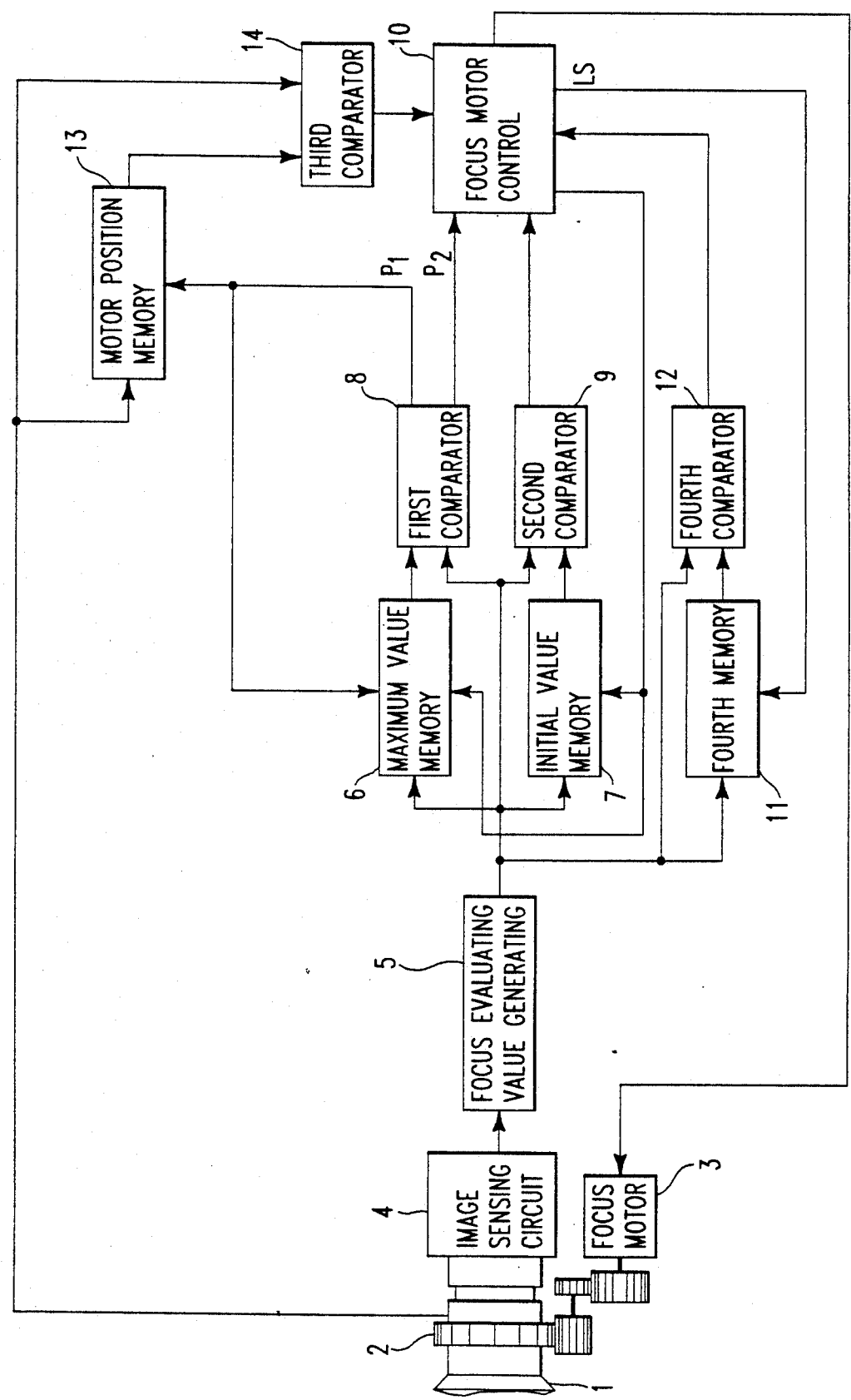
FIG. 7 is a primary block diagram of a conventional automatic focusing camera.
Figure 8:
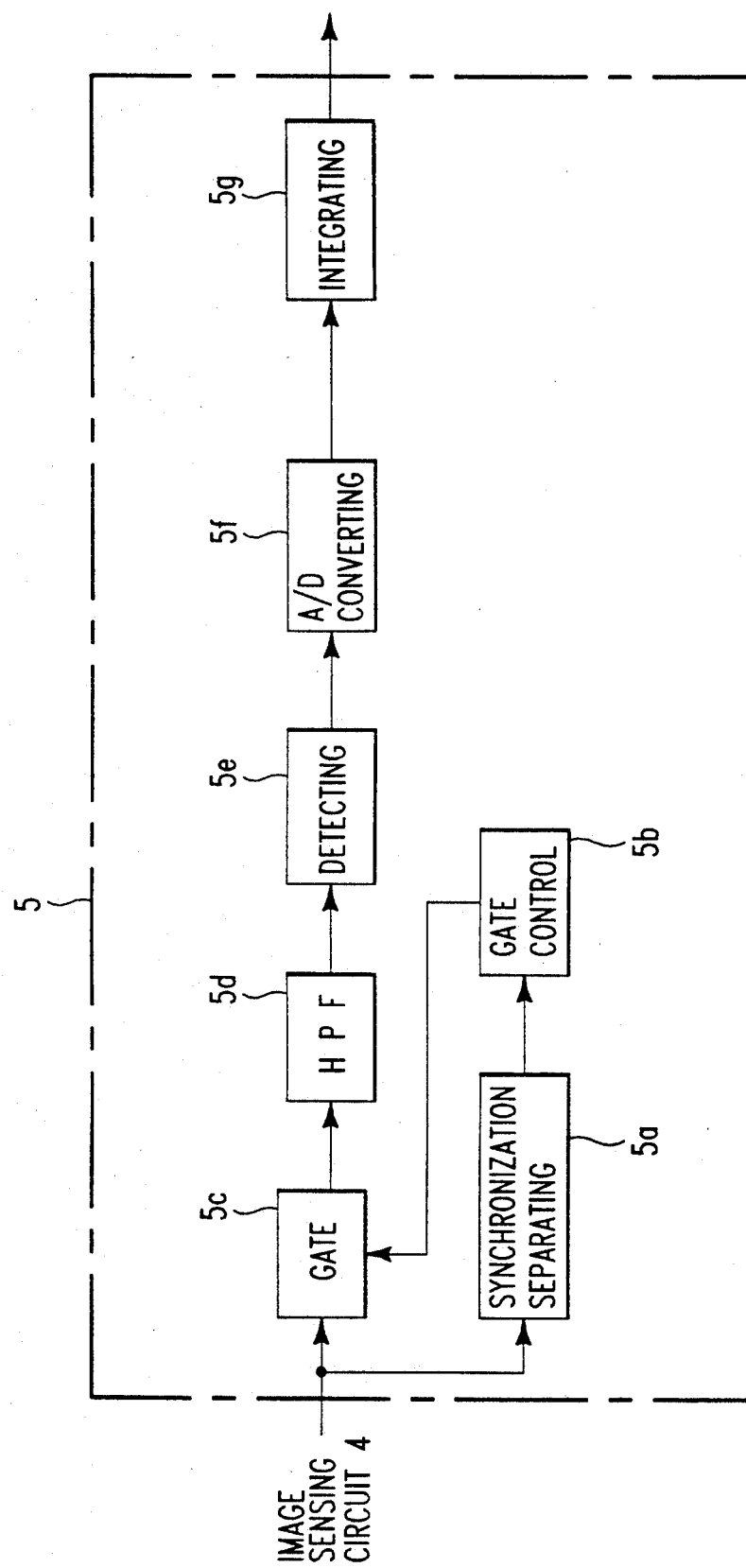
FIG. 8 is a block diagram showing a major portion thereof in detail.
Figure 9:
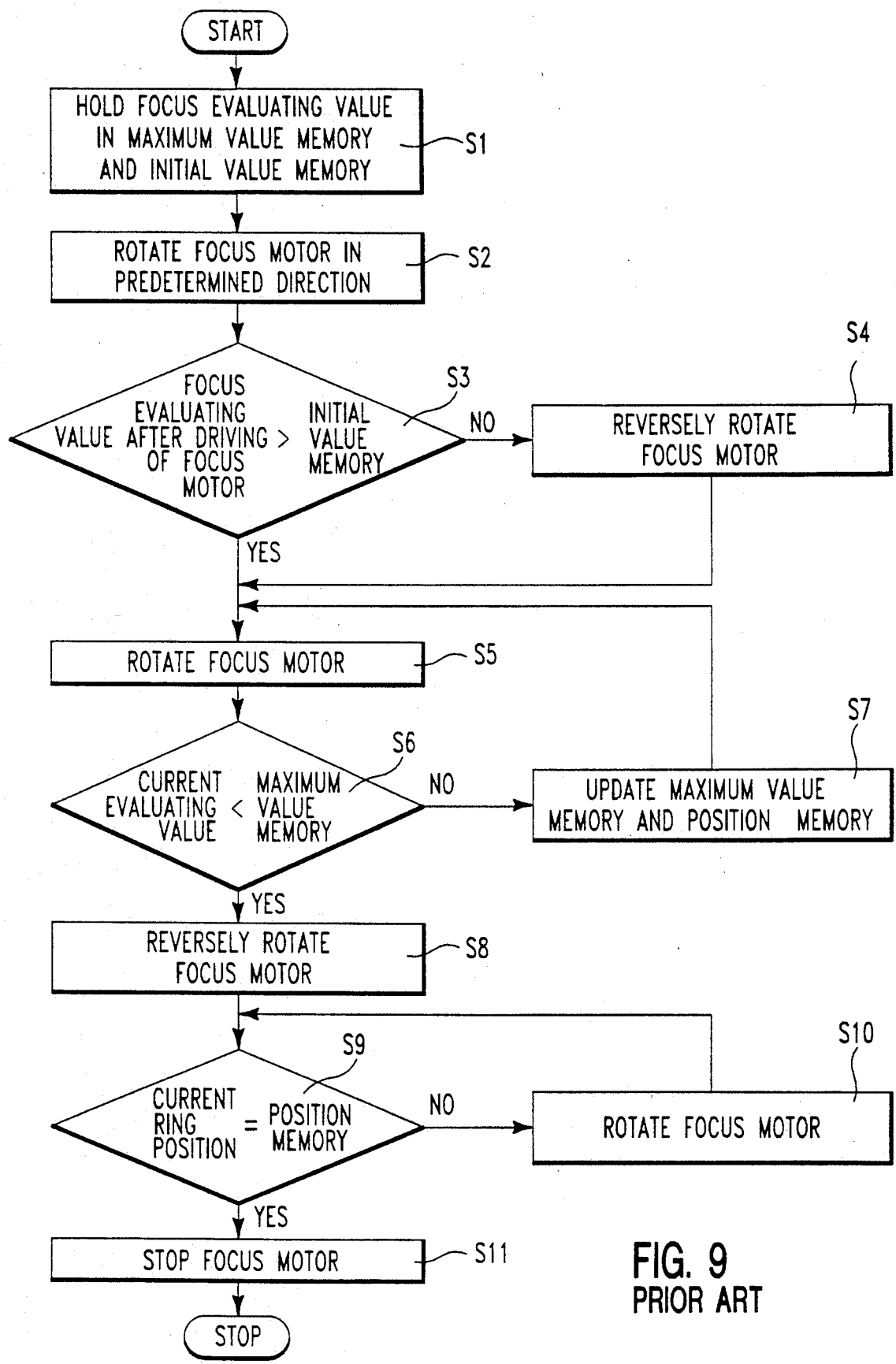
FIG. 9 depicts a flowchart for explaining a conventional automatic focusing operation.

FIG. 1 shows a primary block diagram of a first embodiment of an electronic still camera having an automatic focusing function, wherein the same reference symbols are applied to the same portions as that of FIG. 7 and a description thereof will be omitted. A conventional auto-focusing system takes 2 seconds to perform the automatic focus operation from a nearest point to an infinite-point within the focusable range of the lens. During the focusing operation, it is possible to obtain image signals for 120 fields during the 2 seconds of the focusing time, and therefore, it is possible to obtain focus evaluating values for 120 steps, and accordingly, it can be considered that a focusing accuracy of the focus lens 1 is 1/120 from the nearest point to the infinite-point within the focusable range of the lens.

Figure 2:
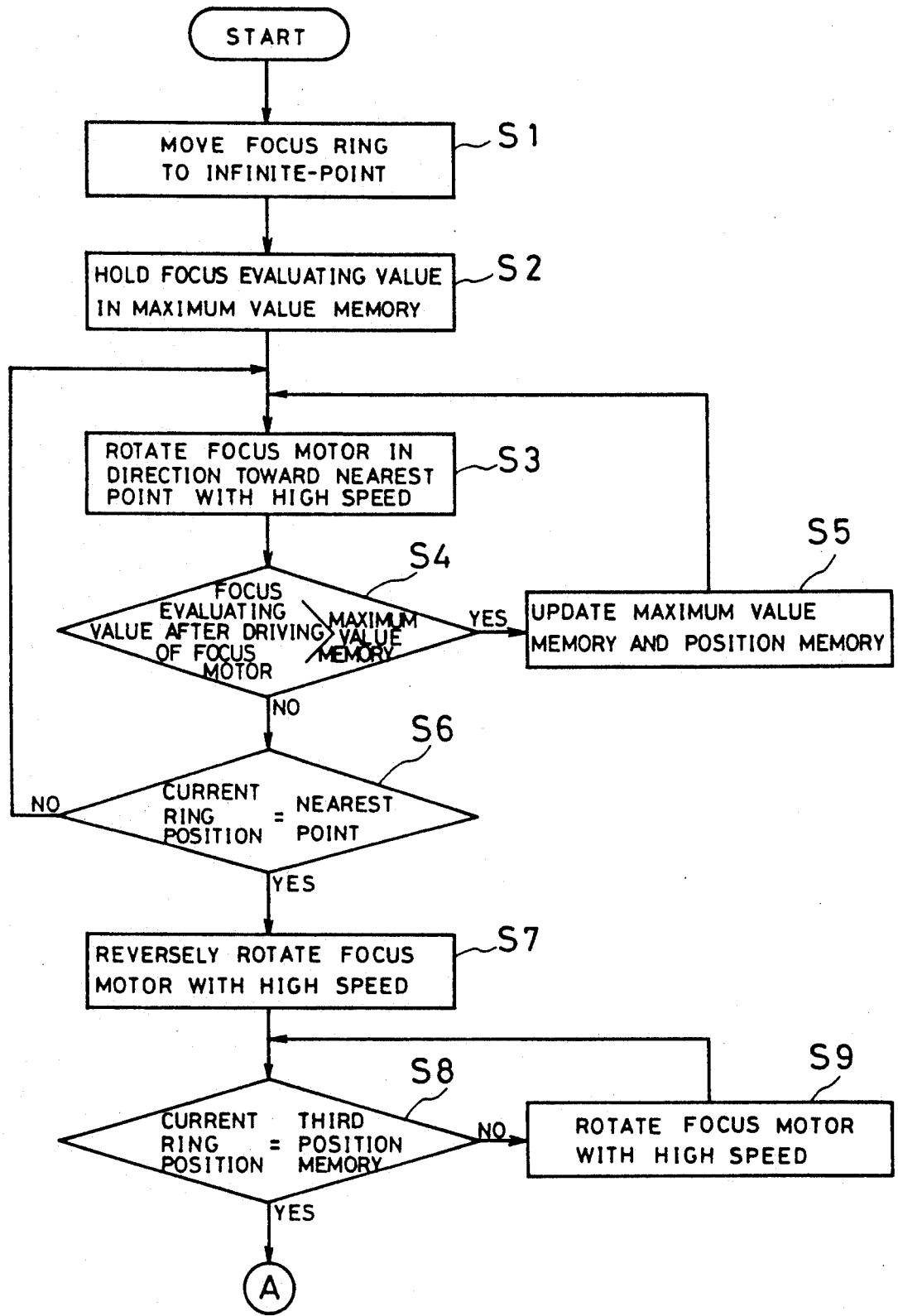
FIG. 2(a) and FIG. 2(b) depict a flowchart for explaining an automatic focusing operation thereof.
Figure 2:
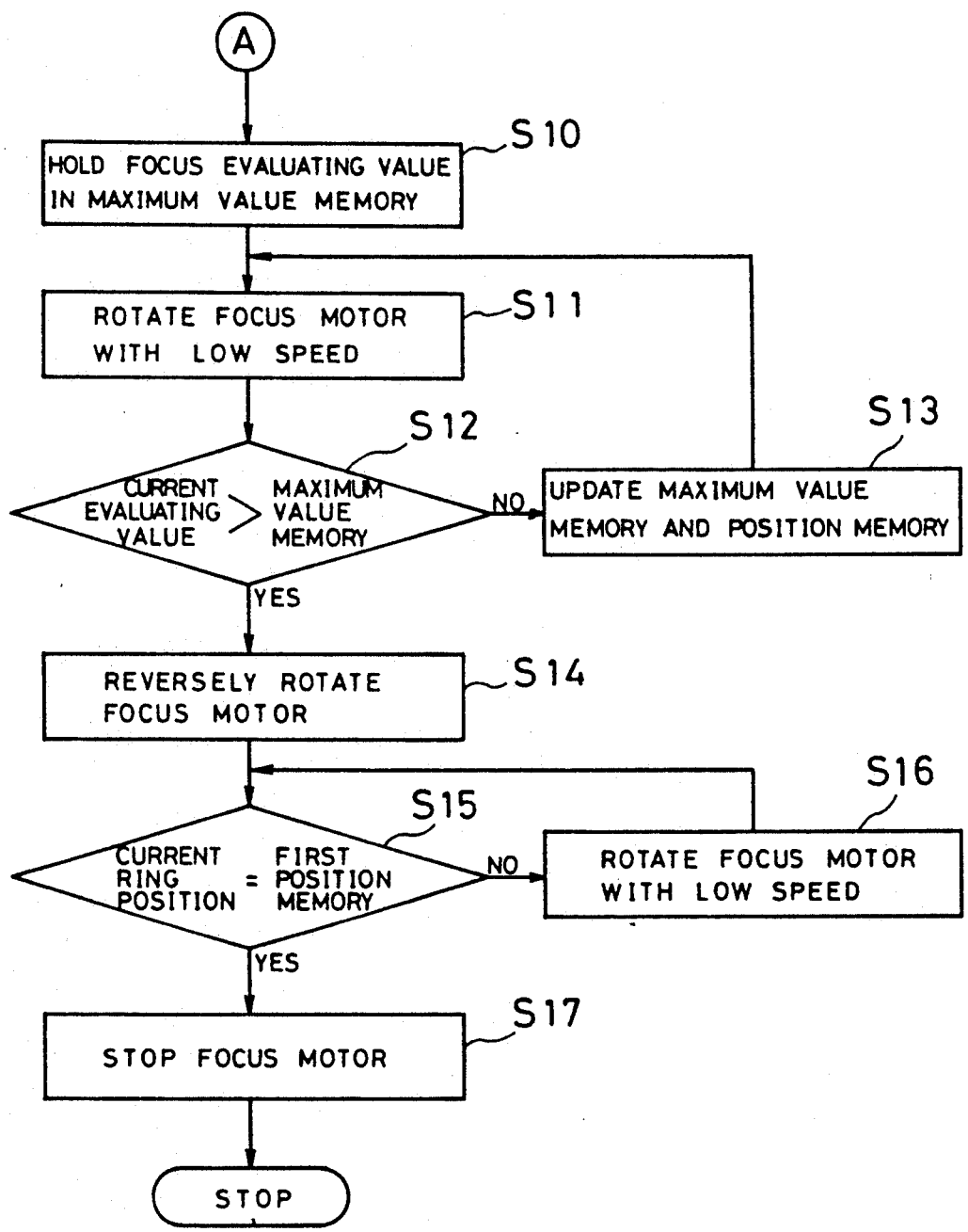

In the following, an operation of FIG. 1 will be described with reference to an operation flowchart of FIG. 2 and a characteristic chart of FIG. 3.

At first, when a camera Ca is set in an automatic focusing mode, prior to a start of an automatic focusing operation, the focus ring 2 is moved toward an infinite-point ($S_1$). When the automatic focusing operation is started, a focus evaluating value obtained at first immediately after the start is held in a maximum value memory 100 ($S_2$), and thereafter, a focus motor control circuit 104 drives the focus motor 3 to rotate the focus ring 2 in a direction toward the nearest point with a speed that is ten times the speed of the focusing ring rotation used in a conventional automatic focusing system, that is, 0.2 seconds ($S_3$). Resultingly, since it is possible to obtain image signals of 12 fields in 0.2 seconds, focus evaluating values for 12 steps are obtained. In accordance with the rotation of the above described focus ring 2, a first comparator 101 compares a maximum focus evaluating value which is held in the maximum value memory 100 as yet with a current focus evaluating value ($S_4$), and outputs a signal when the current focus evaluating value is larger than a content of the maximum value memory 100. In addition, the value of the maximum value memory 100 is updated in response to an output of the first comparator 101 in a case where the current evaluating value is larger than the content of the maximum value memory 100 so that a maximum value of the focus evaluating values by that time can be always held ($S_5$).

A reference numeral 102 denotes a position memory for storing a focus ring position (or a motor position) in response to a focus ring position signal (or a motor position signal) which designates a position of the focus ring 2 (or the focus motor 3). The position memory 102 is composed of a first position memory 102a, a second position memory 102b and a third position memory 102c. The first position memory 102a is, as similar to the maximum value memory 100, updated in response to the output of the first comparator 101 so that focus ring position data (or motor position data) at a time when the focus evaluating value becomes a maximum value can be always held therein. In addition, data of the second position memory 102b is updated so that the second position memory 102b always holds focus ring position data (at a point ⓑ of FIG. 3) one step before the focus ring position data (or the motor position data) at the step wherein the focus evaluating value becomes the maximum value, and the data of the third position memory 102c is updated so that the third position memory 102c always holds focus ring position data (at a point ⓒ of FIG. 3) one step after the focus ring position data (or motor position data) at the step wherein the focus evaluating value becomes the maximum value.

Figure 3:
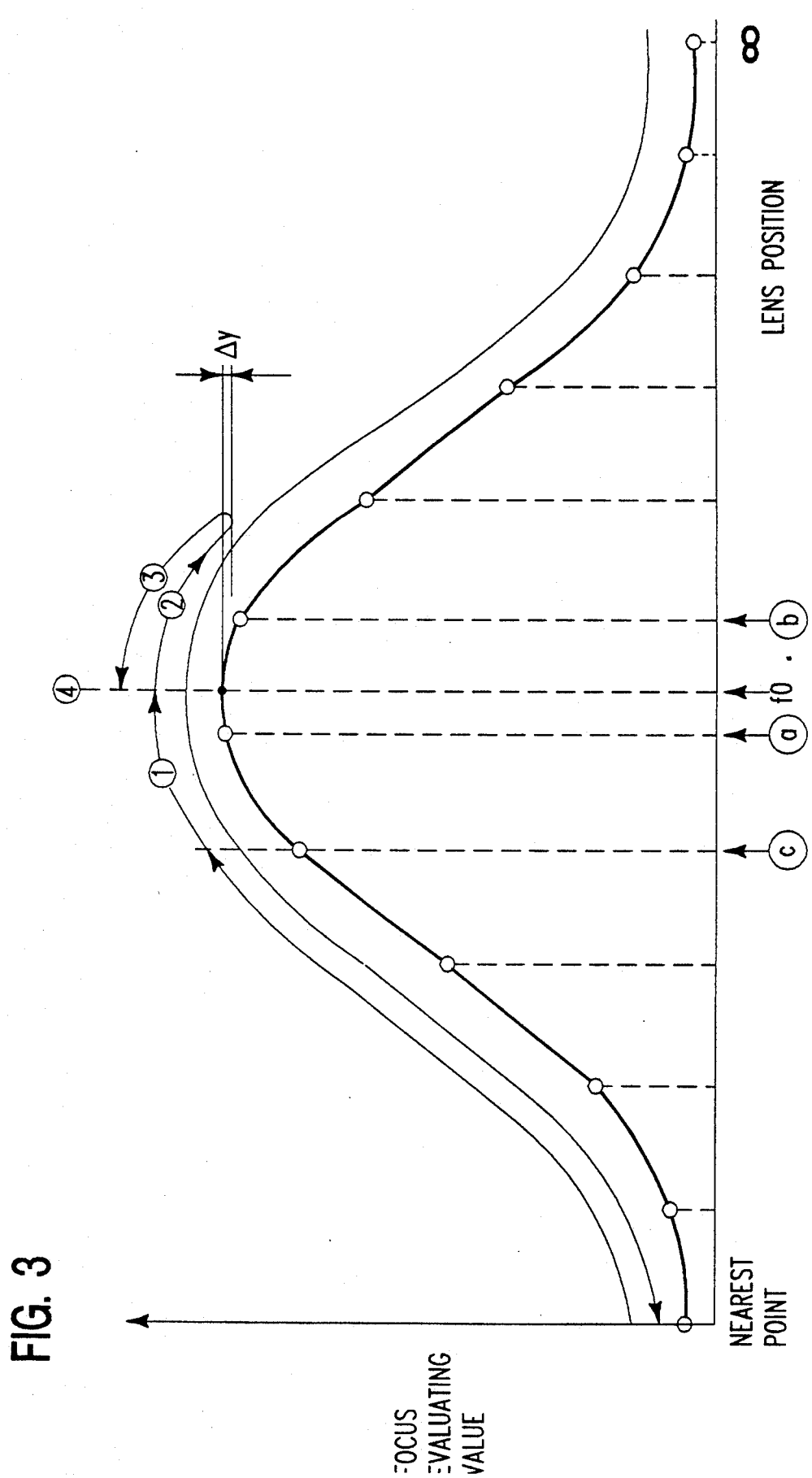
FIG. 3 is a characteristic chart for explaining a focusing operation in accordance with the present invention.

By performing the above described search operation from the infinite-point to the nearest point within the focusable range of the lens ($S_6$), a pseudo maximum focus evaluating value (a first maximum focus evaluating value, that is, an evaluating value at a point ⓐ of FIG. 3) is found, and resultingly, it is possible to determine a lens position where a true maximum value of the focus evaluating value (a second maximum focus evaluating value, that is, an evaluating value at a point $f_0$ of FIG. 3) exists. The apparatus determines the appropriate focus of the lens within 0.2 seconds from when the shutter button is depressed.

Next, a focus motor control circuit 104 reversely rotates the focus motor 3 at a high speed in accordance with a content of said data stored in the third position memory 102c ($S_7$), thereby moving the focus ring 2 in an instant to a position (a point ⓒ of FIG. 3) one step before the first maximum focus evaluating value obtained by the above described search ($S_8$ and $S_9$). Additionally, the focus evaluating value at this point (a focus evaluating value at a point ⓒ of FIG. 3) is held in the maximum value memory 100 ($S_{10}$). Thereafter, in order to search for the second maximum focus evaluating value, the process proceeds to an operation whereby focus ring is rotated at a low speed, that is, at the accuracy of 1/120 (every field) that is similar to that of the conventional operation, and this operation will be described in the following. At first, the focus motor 3 is rotated at a low speed in a direction toward the infinite-point ($S_{11}$)(a state of ① in FIG. 3) and the output of the first comparator 101 is watched.

The first comparator 101 compares the maximum focus evaluating value as yet which is held in the maximum value memory 100 with the current focus evaluating value, and outputs 2 kinds of comparison signals one of which represents that the current focus evaluating value is larger than the content of the maximum value memory 100 (a first mode) and the other of which represents that the current focus evaluating value decreases more than a predetermined first threshold value $\Delta y$ in FIG. 3 (a second mode). In addition, the value of the maximum value memory 100 is updated in response to the output of the first comparator 101 in a case where the current evaluating value is larger than the content of the maximum value memory 100 so that the maximum value of the focus evaluating values by that time can be always held ($S_{12}$).

The first position memory 102a is, as similar to the maximum value memory 100, updated in response to the output of the first comparator so as to always hold focus ring position data when the focus evaluating value becomes the maximum value ($S_{13}$).

The focus motor control circuit 104 monitors the output of the first comparator 101 and reversely rotates the focus motor 3 ($S_{14}$) when the output of the first comparator 101 designates the second mode that the current focus evaluating value is smaller than the maximum focus evaluating value (a state of ② in FIG. 3). After this reverse rotation, the content of the first position memory 102a is compared with a current motor position by the second comparator 3 ($S_{15}$), and the focus motor control circuit 104 rotates the focus motor 3 at a low speed until both become coincident with each other ($S_{16}$) and, when coincident, it is determined that the focus ring 2 returns to a local maximum point of the focus evaluating values and therefore, the focus motor 3 is stopped ($S_{16}$). At the same time, the focus motor control circuit 104 outputs a lens stop signal LS (a state of ④ FIG. 3).

In accordance with the above described operation, it becomes possible to perform an automatic focusing operation with high accuracy and high speed.

Furthermore, the maximum value memory 100, the first comparator 101, the position memory 102, the second comparator 103 and the focus motor control circuit 104 in FIG. 1 can be constructed by a one-chip microcomputer.

Second Embodiment

Figure 4:
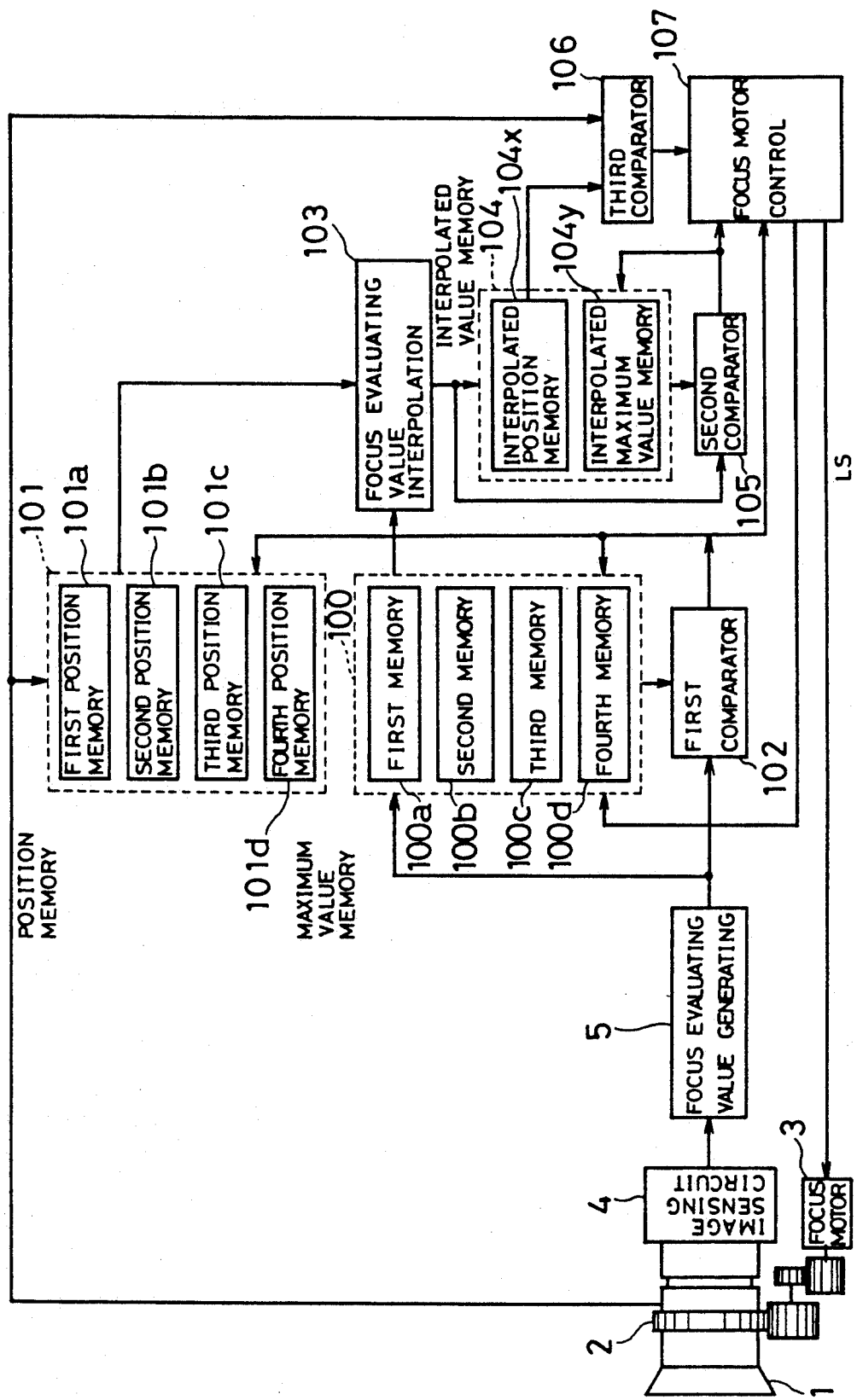
FIG. 4 is a primary block diagram showing a second embodiment of an automatic focusing camera in accordance with the present invention.
Figure 5A:
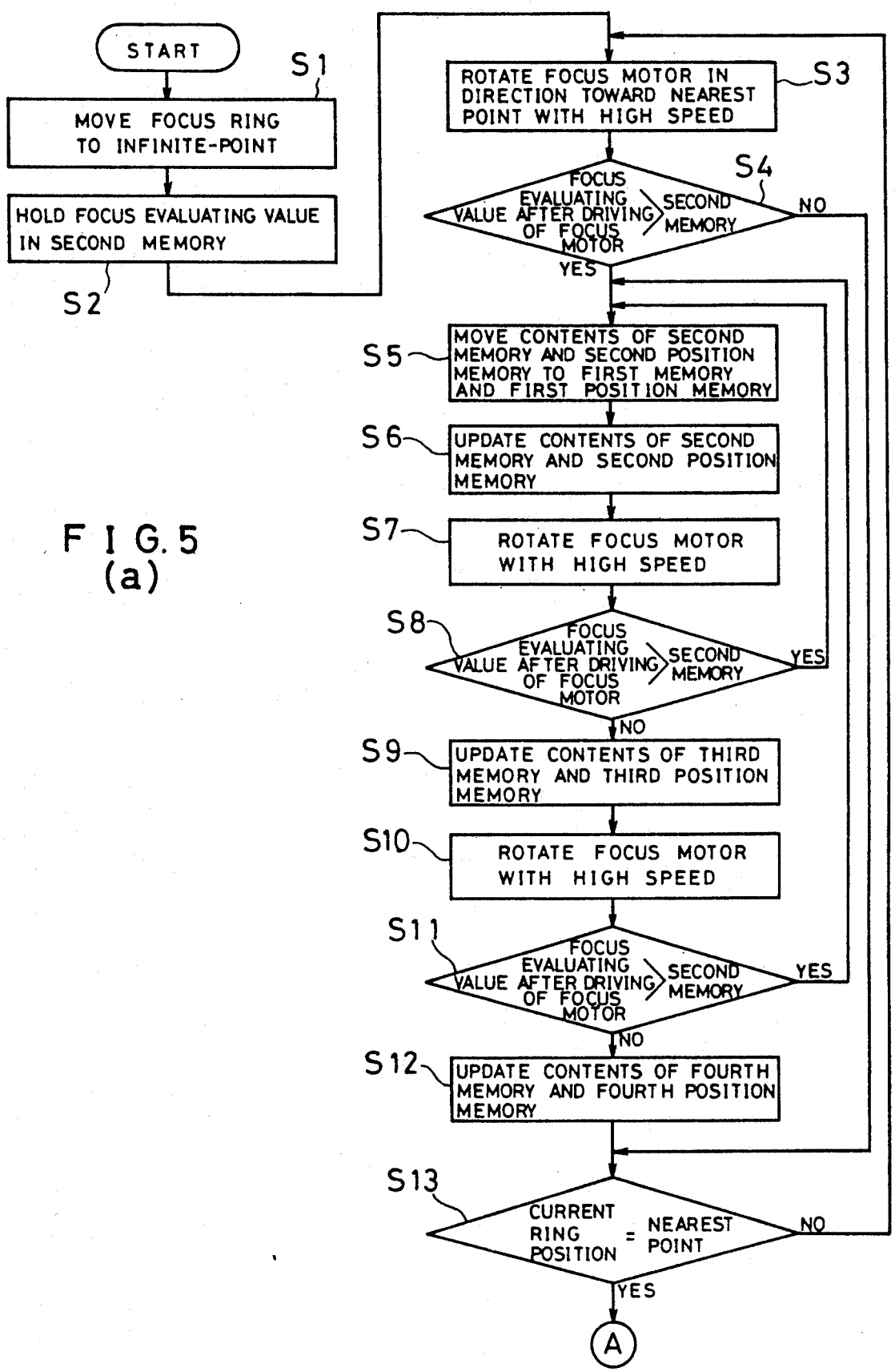
FIG. 5(a) and FIG. 5(b) depict a flowchart for explaining an automatic focusing operation thereof.
Figure 5B:
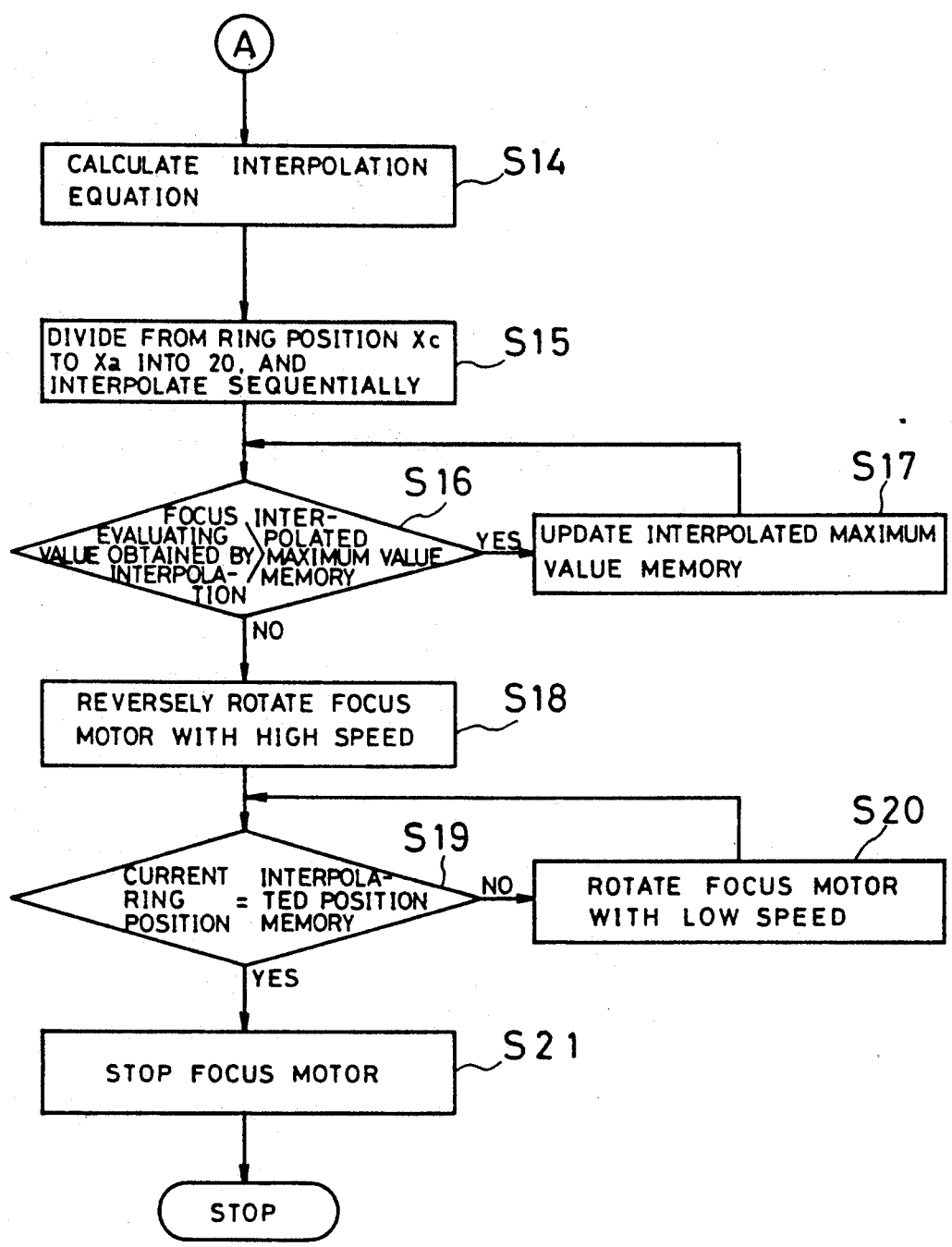
Figure 6:
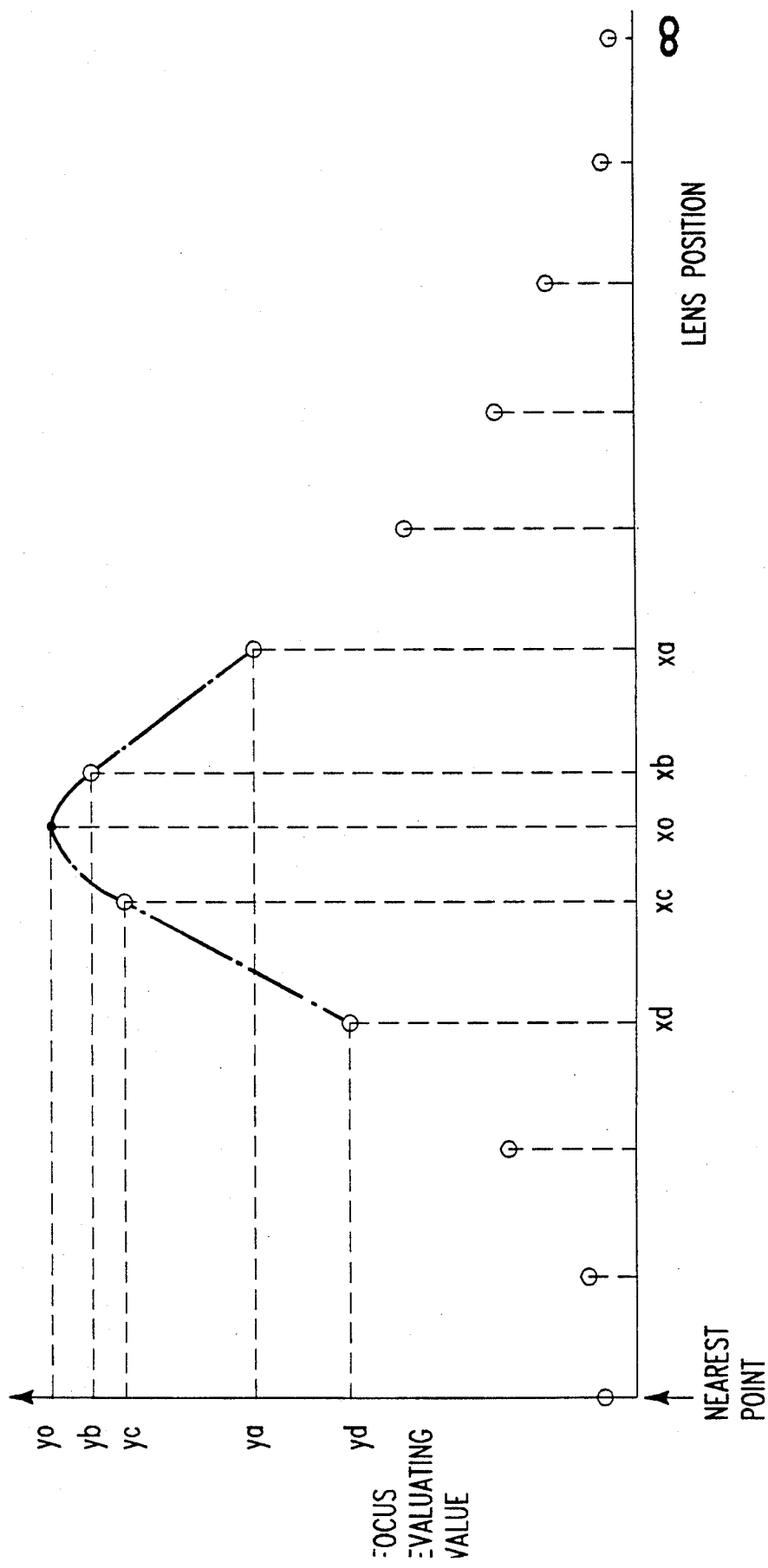
FIG. 6 is characteristic chart for explaining a focusing operation in accordance with the present invention.

FIG. 4 is a block diagram showing portions in association with an automatic focusing of an electronic still camera in accordance with a second embodiment of the present invention, FIG. 5 shows an operation flowchart, and FIG. 6 shows a view for explaining a focusing operation a conventional auto-focusing system takes 2 seconds to perform the automatic focus operation from a nearest point to an infinite-point within the focusable range of the lens. During the focusing operation it is possible to obtain image signals for 120 fields during the 2 seconds of focusing time, and therefore, it is possible to obtain focus evaluating values for 120 steps, and accordingly, the focusing accuracy of the focus lens 1 is 1/120 from the nearest point to the infinite-point of the focusable range of the lens.

In the following, an operation of FIG. 4 will be described with reference to the operation flowchart of FIG. 5 and the characteristic chart of FIG. 6.

At first, when a camera is set in an automatic focusing mode, prior to a start of an automatic focusing operation, the focus ring 2 is moved toward an infinite-point ($S_1$). When the automatic focusing operation is started, a focus evaluating value obtained at first immediately after the start is held in second memory 102b of a maximum value memory 100 having a first, second, third and fourth memories 100a, 100b, 100c and 100d ($S_2$), and thereafter, a focus motor control circuit 107 drives the focus motor 3 to rotate the focus ring 2 in a direction toward the nearest point from an infinite-point at a speed that is ten times the speed in the focusing ring rotation used in a conventional automatic focusing system, that is, 0.2 seconds ($S_3$). Resultingly, since it is possible to obtain image signals of 12 fields in 0.2 seconds, focus evaluating values for 12 steps are obtained as shown in FIG. 6. In accordance with the rotation of the above described focus ring 2, the first comparator 102 compares a maximum focus evaluating value as yet which is held in the second memory 100b with a current focus evaluating value ($S_4$), and outputs a signal when the current focus evaluating value is larger than a content of the second memory 100b. In addition, if an output of the first comparator 102 exits, the value of the second memory 100b is transferred to the first memory 100a ($S_5$) and the value of the second memory 100b is updated ($S_6$), and therefore, a maximum value of the focus evaluating values by that time is always held in the second memory 100b. In accordance with a successive rotation of the focus motor 3 ($S_7$), the both are again compared with each other by the first comparator 102 ($S_8$) in the next step and, when a focus evaluating value obtained in this step is smaller than the value of the second memory 100b, the focus evaluating value is held in the third memory 100c ($S_9$).

In accordance with a further successive rotation of the focus motor 3 ($S_{10}$), the both are again compared with each other by the first comparator 102 in the next step ($S_{11}$) and, when a focus evaluating value obtained in this step is smaller than the value of the second memory 100b, the focus evaluating value is held in the fourth memory 100d ($S_{12}$).

A reference numeral 101 denotes a position memory including a first, second, third and fourth position memories 101a, 101b, 101c and 101d, and the second position memory 102b is a memory which is, as similar to the second memory 100b, updated in response to the output of the first comparator 102 so as to always hold position data of the focus lens when the focus evaluating value becomes the maximum value.

The first position memory 101a is a memory which is updated so as to always hold a focus ring position one step before the focus ring position data that corresponds with the focus evaluating value having the maximum value, and the third position memory 101c is a memory which is updated so as to always hold a focus ring position one step after the focus ring position data that corresponds with the focus evaluating value having the maximum value, and the fourth position memory 101d is a memory which is updated so as to always hold a focus ring position two steps after the focus position data that corresponds with the focus evaluating value having the maximum value, and these first, third and fourth position memories 101a, 101c and 101d respectively correspond to the first, third and fourth memory 100a, 100c and 100d of the maximum value memory 100. Detail functions of the first to the fourth position memories 101a–101d will be understood from ($S_5$), ($S_6$), ($S_9$) and ($S_{12}$) in the flowchart of FIG. 5.

An operation as described above is executed from the infinite-point to the nearest point within the focusable range of the lens ($S_{13}$), whereby it is possible to hold the maximum value of the focus evaluating values at 12 points and focus evaluating values in the vicinity thereof in the maximum value memory 100 within 0.2 seconds from when the shutter button is depressed. In FIG. 6, values thus stored in the maximum value memory 100 and the position memory 101 are shown, $Y_a$, $Y_b$, $Y_c$ and $Y_d$ are respectively corresponding to the values of the first memory 100a, the second memory 100b, the third memory 100c and the fourth memory 100d. In addition, $x_a$, $x_b$, $x_c$ and $x_d$ are respectively corresponding to the values of the first position memory 101a, the second position memory 101b, the third position memory 101c and the fourth position memory 101d.

Thereafter, focus evaluating values of the respective points (interpolation equations for obtaining focus evaluating values) of a case where a distance between the focus ring positions $x_a$ and $x_d$ (that is, focus lens positions) is divided into 30 steps are calculated by a focus evaluating value interpolation calculation circuit 103 ($S_{14}$). The interpolation calculation circuit 103 is constructed by a hardware of, for example, Lagrange interpolation or Spline interpolation which are described in pages 172-205 of a book titled as "A Science Technical Calculation by C" published by CQ Publishing Corporation.

Interpolation results from the interpolation circuit 103 are sequentially outputted, but an interpolation result thus outputted at first is held in an interpolated maximum value memory 104y of an interpolated value memory 104.

A second comparator 105 compares a value of the maximum interpolation result being held in the interpolated maximum value memory 104y as yet with a value of each of the interpolation results sequentially outputted from the focus evaluating value interpolation circuit 103. If the second comparator 105 outputs an output representing that the current focus evaluating value is larger than the value of the interpolated maximum value memory 104y, the value of the interpolated maximum value memory 104y is updated so that the maximum value of the interpolation results by that time can be always held in the interpolated maximum value memory 104y, and the same time, the focus lens position is held in an interpolated position memory 104x.

By performing the above described operation that the content of the interpolated memory 104 is updated in response to the output of the second comparator 105 for each of the interpolated focus evaluating values for 20 steps which are obtained between $x_a$ and $x_c$ in FIG. 6, it is possible to obtain the position data of the focus ring 2 when the interpolated focus evaluating value becomes maximum in the interpolated position memory 104x (see ($S_{15}$), ($S_{16}$) and ($S_{17}$) of the flowchart in FIG. 5).

In addition, in this embodiment shown, the interpolated values are obtained by dividing the distance from $x_a$ to $x_c$ into 20 steps; however, instead thereof, at first, the focus evaluating value $y_a$ at $x_a$ and the focus evaluating value $y_c$ at $x_c$ are compared with each other, and then, since a maximum focus evaluating value necessarily exists between $x_b$ and $x_c$ if $y_a < y_c$, it is possible to more rapidly find the maximum focus evaluating value if a distance between $x_b$ and $x_c$ is divided into 10 steps and the comparison operation as similar to the above described operation by means of the second comparator is performed. Inversely, if $y_a > y_c$, a maximum focus evaluating value necessarily exists between $x_a$ and $x_b$, and therefore, it is possible to obtain a maximum focus evaluating value by the comparison operation similar to the above described operation by dividing a distance between $x_a$ and $x_b$ into 10 steps.

When the maximum interpolated focus evaluating value is thus obtained, the focus motor control circuit 107 rotates the focus ring 2 at a high speed from the nearest point toward the infinite-point ($S_{18}$). In response thereto, the data of the interpolated position memory 104x are compared with the current position data of the focus ring 2 by the third comparator 106 until the both becomes coincident with each other ($S_{19}$ and $S_{20}$), and the focus motor control circuit 107 functions to stop the focus motor 3 when both position data become coincident with each other ($S_{21}$). At this time, the focus motor control circuit 107 outputs a lens stop signal LS. In addition, $x_0$ is shown as a focused point and a maximum focus evaluating value at that time is shown by $y_0$. The first comparator 102, the second comparator 105, the third comparator 106, the maximum value memory 100, the position memory 101, the focus evaluating value 103, the interpolated value memory 104 and the focus motor control circuit 107 can be constructed by a one-chiped microcomputer.

In the above described respective embodiments, prior to the start of the automatic focusing operation, the focus ring is moved once to the infinite-point and thereafter the same is moved to the nearest point; however, inversely, the focus ring may be moved once to the nearest point thereafter the same is moved to the infinite-point.

In addition, it is not necessary to move the focus ring to the infinite-point or the nearest point prior to the start of the automatic focusing operation, in sum, the focus ring may be moved so that the first maximum focus evaluating value can be searched between the infinite-point and the nearest point, and therefore, an initial position of the focus ring is not limited.

POSSIBILITY OF UTILIZATION IN INDUSTRY

As described above, an automatic focusing camera in accordance with the present invention can obtain a focused state with a short time and high accuracy, and therefore, the present invention is especially suitable to a case where the same is utilized as an electronic still camera.

We claim:

1. An automatic focusing camera in which an automatic focusing operation is performed by detecting a high frequency component of a video signal which is obtained from an image sensor device at predetermined periods as a focus evaluating value, said automatic focusing camera comprising:

first search means which moves a focus lens, in a first direction at a first speed, between an infinite focal point lens position and a nearest focal point lens position in incremental steps of first fixed size, wherein said infinite focal point lens position and said nearest focal point lens position define two extremes of a focal distance range of the lens, and produces a focus evaluating value for each step forming a first plurality of focus evaluating values wherein a maximum focus evaluating value in said plurality of focus evaluating values is a first maximum focus evaluating value, and second search means for continuously moving said focus lens, in a second direction opposite said first direction at a second speed being faster than said first speed, to a lens position one step adjacent to a lens position corresponding to said first maximum focus evaluating value, and thereafter, further moves said focus lens, in said second direction at a third speed being slower than said second speed, with incremental steps having a second size smaller than said first fixed size, and produces a focus evaluating value at each respective step forming a second plurality of focus evaluating values, wherein a maximum focus evaluating value in said second plurality of focus evaluating values is a second maximum focus evaluating value corresponding to an in-focus lens position.

2. An automatic focusing camera in which an automatic focusing operation is performed by detecting a high frequency component of a video signal which is obtained from an image sensor device at predetermined periods as a focus evaluating value, said automatic focusing camera comprising:

lens position changing means for changing a relative position of a focus lens with respect to the image sensor device, first search means which causes said lens position changing means to move said focus lens, in a first direction at a first speed, between an infinite focal point lens position and a nearest focal point lens position in incremental steps of first fixed size, wherein said infinite focal point lens position and said nearest focal point lens position define two extremes of a focal distance range of the lens, and produces a focus evaluating value for each step forming a first plurality of focus evaluating values wherein a maximum focus evaluating value in said plurality of focus evaluating values is a first maximum focus evaluating value, and second search means which causes said lens position changing means to continuously move said focus lens, in a second direction opposite said first direction at a second speed being faster than said first speed, to a lens position one step adjacent to a lens position corresponding to said first maximum focus evaluating value, and thereafter, further causes said lens positioning means to move said focus lens, in said second direction at a third speed being slower than said second speed, with incremental steps having a size smaller than said first fixed size, and produces a focus evaluating value at each respective step forming a second plurality of focus evaluating values, wherein a maximum focus evaluating value in said second plurality of focus evaluating values is a second maximum focus evaluating value corresponding to an in-focus lens position.

* * * * *